No. 880,166. PATENTED FEB. 25, 1908.
G. W. RUGGLES.
GREEN CORN FORK.
APPLICATION FILED SEPT. 13, 1907.
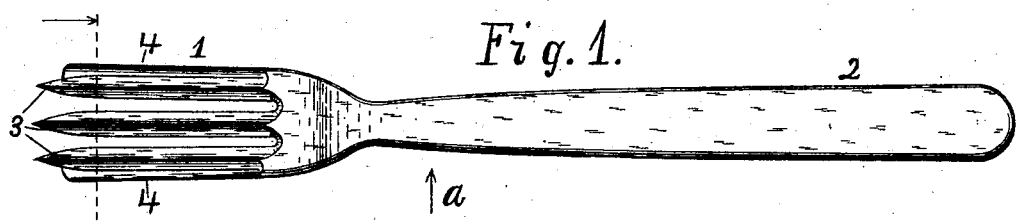
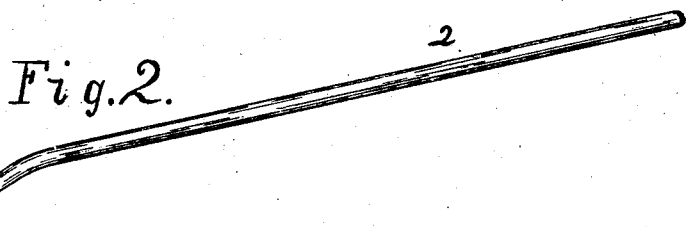
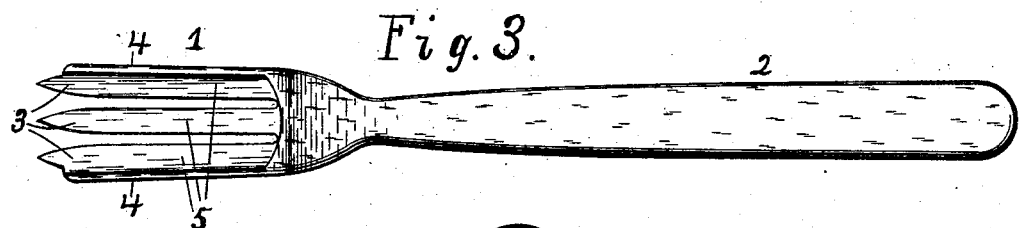
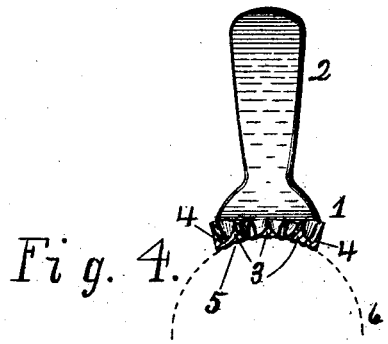
Attest:
A. M. Whitmore,
M. Conway.
Inventor:
George W. Ruggles,
by E. B. Whitmore, Atty.

UNITED STATES PATENT OFFICE.

GEORGE W. RUGGLES, OF CHARLOTTE, NEW YORK.

GREEN-CORN FORK.

No. 880,166.      Specification of Letters Patent.      Patented Feb. 25, 1908.

Application filed September 13, 1907. Serial No. 392,700.

*To all whom it may concern:*

Be it known that I, GEORGE W. RUGGLES, of Charlotte, in the county of Monroe and State of New York, have invented a new and useful Improvement in Green-Corn Forks, which improvement is fully set forth in the following specification and shown in the accompanying drawings.

My invention relates to improvements in implements for table use, and it belongs to the class of devices employed for conveying food to the mouth in the act of eating.

The invention is a combined fork and spoon, of novel form and construction, designed more particularly for readily and conveniently taking the kernels from an ear of boiled or roasted green corn in suitable quantities and safely conveying them to the mouth.

In common practice the kernels of cooked green corn are taken from the ear by biting them off or by cutting them from the cob with an ordinary table knife both of which methods being objectionable and unsatisfactory. Biting the kernels of corn from the cob is primitive, and it is otherwise objectionable, frequently on account of the condition of the front teeth, and also from uncleanliness on account of the unseemly smearing of the lips and the mustache. Cutting the kernels from the cob with a knife is also unsatisfactory from the fact that the knife, being straight, must touch the surface of the cob tangentially and thus while cutting the kernels of the row at the middle of the cut properly from the cob the kernels in the rows at either side of the middle row are cut through at the middle or otherwise undesirably haggled or sliced.

To avoid these objections and difficulties and to provide an implement for satisfactorily lifting the kernels cleanly from the cob and in a whole or undivided state and without waste is the main object of this invention the implement being, in a sense, a spoon with the bowl longitudinally divided to form tines similar to those of a table fork.

Other objects and advantages of the invention will be brought out and made to appear in the following description, and particularly pointed out in the appended claims, reference being had to the accompanying drawing which, with the reference numerals marked thereon, forms a part of this specification.

In the drawing Figure 1 is a plan of the device. Fig. 2 is a side elevation seen as indicated by arrow *a* in Fig. 1. Fig. 3 is a plan of the back or reverse side of the device. Fig. 4 is a transverse section on the dotted line in Fig. 1.

Referring to the parts shown, 1 is the head or bowl of the implement, and 2 the handle. The head or bowl is longitudinally divided to form a series of tines 3, there being also at the outer sides of the two outside tines thin raised side portions 4 higher than the tines, for safely holding and conveying the kernels separated from the cob, after the manner of a spoon. This implement is made of suitable metal, the tines being triangular in cross section and all three of the sides or faces of each being concave, as appears in Fig. 4. The upper sides or faces of the tines are sharply concaved, or transversely curved to a short radius, which gives the tines sharp cutting edges near the cob which edges are tapered laterally, as appears in Figs. 1 and 3, the taper being preferably along circular or curved lines, as shown.

The back or under surface 5 of the bowl 1 is concaved transversely, as appears in Figs. 3 and 4, giving to the bowl a form to coincide with or fit the convex surface of the cob, represented by the dotted circular arc 6. The bowl is also slightly curved longitudinally, as appears in Fig. 2, the convex side being beneath, to admit of a slight longitudinal rocking or tilting of the fork on the cob. This aids in the matter of properly running or forcing the tines under the kernels as the fork is advanced at intervals in taking the kernels, enough being taken at each advance movement to substantially fill the bowl.

In using this device it is taken in the right hand, the stem of the ear of corn being taken in the left, the axes of the ear and the fork being in a plane. The points of the tines are inserted under the kernels at the point or small end of the ear and the fork pushed longitudinally toward the stem until the bowl is filled. The kernels in three adjacent rows are commonly taken together the back surfaces of the tines resting against the cob and removing the kernels cleanly therefrom, the high sides 4 serving to hold them like the bowl of a spoon.

What I claim as my invention and desire to secure by Letters Patent is:—

1. A green corn fork having a handle and a bowl at one end thereof divided longitudinally, with its under face curved transversely, said bowl being curved longitudinally and provided with tines extending throughout the length of the transversely curved portion of the bowl, each of said tines being triangular in cross section with two of the sides of each concave.

2. A green corn fork, having a part to be held in the hand and a series of tines at one end thereof triangular in cross section, the three faces of each tine being concave.

3. A green corn fork having a handle and a bowl having a concave lower surface, said bowl being longitudinally divided forming tines extending throughout the length of the concave portion, said tines being each triangular in cross section and the three faces of each tine being concave the outer edges of the outside tines being raised.

In witness whereof, I have hereunto set my hand this 12th day of September, 1907, in the presence of two subscribing witnesses.

GEORGE W. RUGGLES.

Witnesses:
E. B. WHITMORE,
A. M. WHITMORE.